June 7, 1938. C. W. SPROULL Re. 20,755

VALVE

Original Filed Feb. 27, 1936

Inventor
Charles W. Sproull

By Hardway & Cathey
Attorneys

Reissued June 7, 1938

Re. 20,755

UNITED STATES PATENT OFFICE 20,755

VALVE

Charles W. Sproull, Houston, Tex.

Original No. 2,048,975, dated July 28, 1936, Serial No. 66,010, February 27, 1936. Application for reissue December 15, 1936, Serial No. 117,466

4 Claims. (Cl. 251—96)

This invention relates to a valve.

An object of the invention is to provide a valve of the character described having a controlling assembly therein whereby the valve may be opened and closed and which has a substantially continuous conduit therethrough when the valve is in open position without internal pockets or recesses for the collection of detritus.

Another object of the invention is to provide, in a valve mechanism a casing having a surrounding inside seat and provided with a conduit therethrough, said casing having a fixed core therein which is provided with a conduit in alignment with the casing conduit and a sleeve about, and having a threaded connection with, the core, said sleeve having openings and being movable into one position to align its openings with said conduits and into another position to move the sleeve openings out of such alignment to close said conduits, said sleeve being seated against said seat in either of its positions.

Another object of the invention is to provide a valve mechanism including a casing having a conduit and having a fixed core in the casing provided with a conduit which is aligned with the conduit through the casing with an expansible sleeve about the core having openings and movable into one position to align the openings with said conduits and into another position to move the sleeve openings out of such alignment to close said conduits, said core and sleeve having co-acting parts effective to expand the sleeve to form a fluid-tight joint with the casing when the sleeve reaches the limit of its movement in either of said positions.

A further object of the invention is to provide a valve of the character described having novel means for operating the sleeve into open or closed position.

It is another object of the invention to provide a valve having a casing and a controlling assembly therein mounted to protect the casing against the abrading influence of gritty fluid being conducted under pressure through the valve.

With the above and other objects in view the invention has particular relation to certain novel features of construction, operation, and arrangement of parts, an example of which is given in this specification and illustrated in the accompanying drawing wherein.

Figure 1:
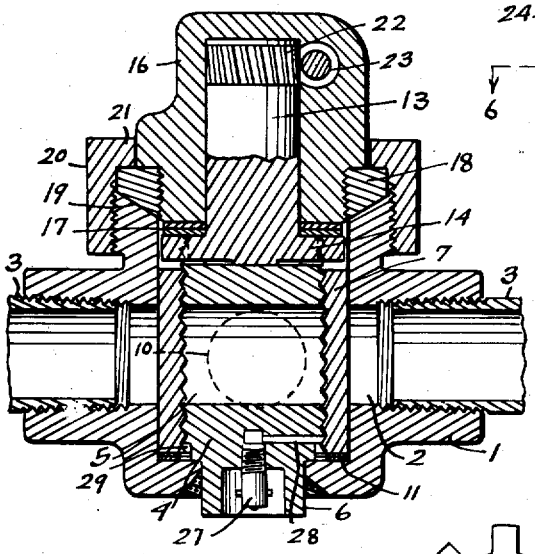
Figure 1 shows a sectional view of the valve.
Figure 2:
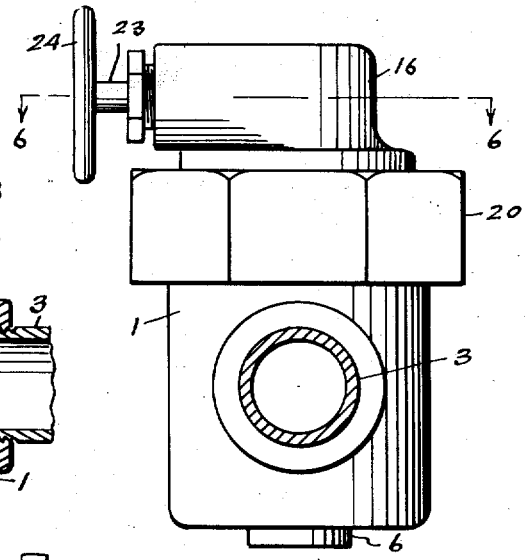
Figure 2 shows a side elevation.
Figure 3:
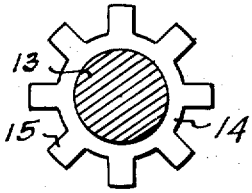
Figure 3 shows a cross-sectional view of the operating stem.
Figure 4:
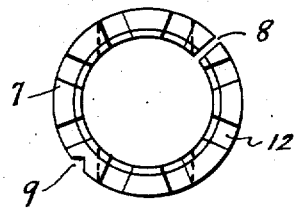
Figure 4 shows an end view of the valve sleeve.
Figure 5:
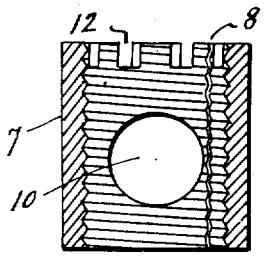
Figure 5 shows a longitudinal sectional view thereof.
Figure 6:
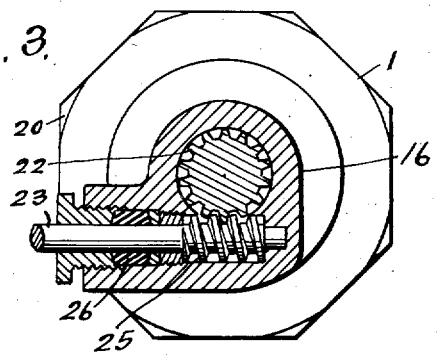
Figure 6 shows a cross-sectional view of the valve taken on the line 6—6 of Figure 2.

Referring now more particularly to the drawing wherein like numerals of reference designate similar parts in each of the figures, the numeral 1 designates a valve casing having the conduits 2 therethrough which is in alignment with the fluid-conducting pipes 3, 3, which are connected into the valve casing.

There is a fixed core 4 in the casing having a conduit 5 therethrough which is in alignment with the conduit 2. One end of the core is extended through the casing and formed into a protesting housing 6. This housing may be welded or otherwise permanently secured to the valve casing 1 so as to hold the core 4 stationary. The core 4 is externally threaded and is spaced from the casing all the way around and threaded onto the core and fitted closely in the casing there is the sleeve 7 which may be split from end to end at one side, as at 8, if desired, to permit its expansion and contraction, and on the other side is provided with the external, longitudinal groove 9. The sleeve has the oppositely disposed openings 10, 10, substantially equal in diameter to the diameter of the conduits 2, 5. Said sleeve is turnable to one position to align the openings 10 with said conduits to permit the flow of fluid through the valve and is turnable into another position to carry the openings 10 out of alignment with said conduits to prevent such flow.

There are the anti-friction rings 11 between the valve casing, and one end of the sleeve 7, and the other end of the sleeve is formed with notches 12. There is an operating stem 13 whose inner end is provided with an external, annular flange 14 having the radial lugs 15 which work in the notches 12.

There is a bonnet 16 fitted over and enclosing the stem 13, and between the inner end of the bonnet and the flange 14 are the anti-friction bearing rings 17. The inner end of the bonnet 16 is reduced and externally threaded and has an annular gland 18 screwed thereon whose inner face is tapered and fits into a correspondingly tapered seat 19 of the valve casing. The gland 18 is of a greater outside diameter than that of the bonnet 16 and a flange nut 20 is fitted around the bonnet and screwed onto the valve casing and has an internal, annular flange 21 which engages the gland 18 to maintain the bonnet assembled with the valve casing. The outer end of the stem 13 has the external screw threads 22, and mounted in the outer end of the bonnet there is an operating stem 23 whose outer end carries the handwheel 24 and whose inner end is formed with a screw-gear 25 in mesh with the gear 22. The stem 23 has suitable bearings in the bonnet on opposite sides of the gear 25 and is also packed with a suitable stuffing box 26. By turning the stem 23, the stem 13 will also be turned, imparting rotation also to the sleeve 7. As said sleeve is turned, it will also be moved longitudinally relative to the core 4 on account of its threaded connection therewith. When the sleeve is turned a quarter turn in one direction, it will carry the openings 10 into alignment with the conduit 2 and is arranged to be stopped in said position by its thrust against the friction rings 11. A further attempt to turn the sleeve 7 will cause the intermeshing threads of the sleeve to ride up on the corresponding threads of the core 4, as illustrated in Figure 1, causing a uniform expansion of the sleeve and causing it to fit tightly in the valve casing to prevent leakage. When the stem 23 is turned in the other direction, the stem 13 and sleeve 7 will be correspondingly turned in said last-mentioned direction carrying the openings 10 out of registration with the conduit 2 and the co-action of the threads will move the sleeve 7 longitudinally against the flange 14, and a further attempt to turn said stem will cause the threads of the sleeve to ride up on the threads of the core 4 in the reverse position to that indicated in Figure 1 causing a uniform expansion of the sleeve, and thus causing the sleeve to fit tightly in the valve casing to prevent leakage.

It will be noted that the core 4 will protect the parts of the valve casing adjacent the conduit 2 and prevent said casing from being cut out by gritty fluid flowing therethrough under high pressure. The sleeve, in intermediate position will contract and may, therefore, be easily turned.

A grease gun connection 27 may be located in the housing 6 and screwed into the valve casing 1. Leading from this connection through the core 4 there is a channel 28 which terminates in an annular channel 29 around the core. A lubricant may be forced through the channels 28 and 29 and will find its way between the intermeshing threads above referred to and will also pass along the groove 9 and the slot 8 located at the open side of the sleeve 7, and will finally find its way to all the internal working parts so as to keep the same thoroughly lubricated. A heavy grease or oil may be used so as to also prevent leakage of the fluid being conducted through the valve.

The drawing and description disclose what is now considered to be a preferred form of the invention by way of illustration only while the broad principle of the invention will be defined by the appended claims.

What I claim is:—

1. A valve comprising a casing having a flow conduit therethrough, a core fixed in the casing having a conduit therethrough, said conduits being in alignment, an expansible sleeve on the core having openings, means for turning the sleeve to move the openings into and out of registration with the conduits and co-acting means on the core and sleeve effective to expand the sleeve, when it reaches the limit of its movement in either direction.

2. A valve comprising a casing, a core fixed therein, an expansible sleeve fitted into the casing and surrounding the core, the casing and core having a flow-way and the sleeve having openings arranged to move into and out of alignment with the flow-way as the sleeve is correspondingly turned, said core and sleeve having co-acting sloping faces effective to expand the sleeve when the sleeve reaches the limit of its movement in either direction.

3. A valve comprising a casing, an externally threaded core fixed therein, an expansible sleeve fitted into the casing and threaded onto the core, said casing and core having a flow-way therethrough, the sleeve being provided with openings into and being turnable to move the openings into and out of registration with the flow-way.

4. A valve comprising a casing, an externally threaded core fixed therein, a sleeve fitted into the casing and threaded on to the core, said casing and core having a flow-way therethrough, the sleeve being provided with openings and being turnable to move the openings into and out of registration with the flow-ways, a stem turnable in the casing and connected with the sleeve and having an abutment thereon at one end of the sleeve, antifriction means in the casing at the other end of the sleeve, said abutment and antifriction means forming stops to limit the endwise movement of the sleeve in each direction.

CHARLES W. SPROULL.